(12) United States Patent
Vogt et al.

(10) Patent No.: US 7,384,681 B2
(45) Date of Patent: Jun. 10, 2008

(54) COMPOSITE DIMENSIONAL FABRIC

(75) Inventors: Kirkland W. Vogt, Simpsonville, SC (US); Jane E. Armstrong, Blackley (GB)

(73) Assignee: Milliken & Company, Spartanburg, SC (US)

(*) Notice: Subject to any disclaimer, the term of this patent is extended or adjusted under 35 U.S.C. 154(b) by 508 days.

(21) Appl. No.: 11/063,185

(22) Filed: Feb. 22, 2005

(65) Prior Publication Data
US 2005/0214510 A1    Sep. 29, 2005

Related U.S. Application Data

(60) Provisional application No. 60/547,242, filed on Feb. 24, 2004.

(51) Int. Cl.
*B32B 5/14* (2006.01)
*B32B 5/26* (2006.01)
*D04H 1/00* (2006.01)
*D03D 13/00* (2006.01)

(52) U.S. Cl. ............... 428/171; 428/175; 442/2; 442/35; 442/50; 442/203; 442/239

(58) Field of Classification Search ............. 428/171, 428/175; 442/2, 35, 50, 203, 239
See application file for complete search history.

(56) References Cited

U.S. PATENT DOCUMENTS

| | | | |
|---|---|---|---|
| 3,123,838 A * | 3/1964 | Wilson | 156/462 |
| 4,018,957 A | 4/1977 | Werner et al. | |
| 4,303,695 A | 12/1981 | McCann et al. | |
| 5,965,232 A | 10/1999 | Vinod | |
| 6,764,744 B2 | 7/2004 | DeMott et al. | |
| 2003/0039806 A1 | 2/2003 | Weder | |
| 2004/0084158 A1* | 5/2004 | Colson et al. | 160/84.05 |

FOREIGN PATENT DOCUMENTS

WO   WO 9515410 A1 *  6/1995

* cited by examiner

*Primary Examiner*—Jenna-Leigh Befumo
(74) *Attorney, Agent, or Firm*—Terry T. Moyer; Charlotte C. Wilson

(57) ABSTRACT

A family of composite fabrics is disclosed, such fabrics comprising a relatively thick textile substrate or base to which is attached a sheer fabric, and a method for making same. Contours or three-dimensional patterns associated with the surface of the base to which the sheer fabric is attached are visible through the sheer fabric, imparting to the composite a decorative, three-dimensional quality that is both original and desirable.

20 Claims, 7 Drawing Sheets

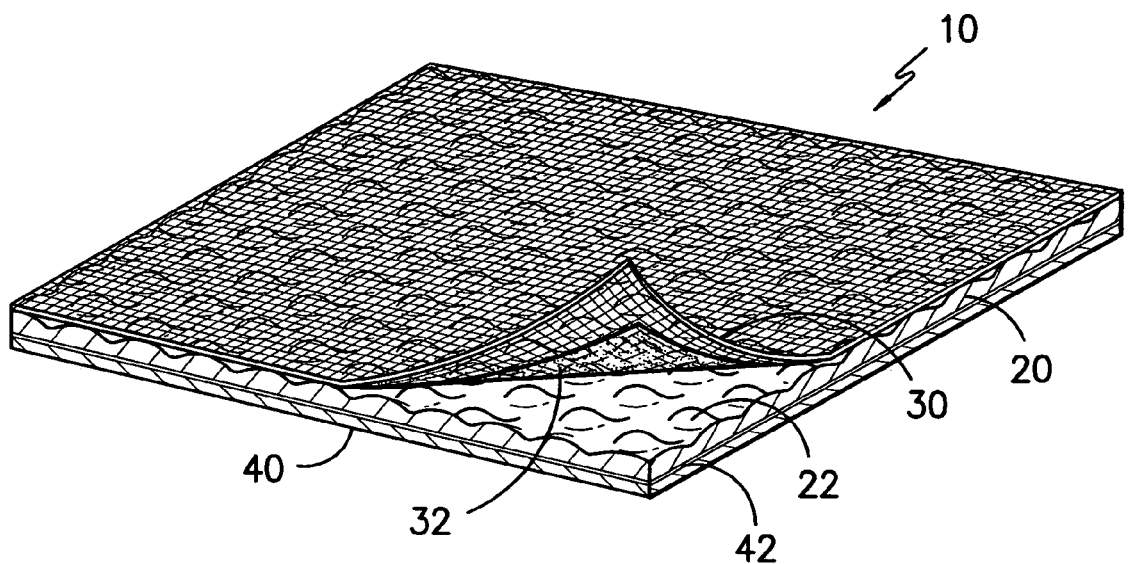
FIG. -1-
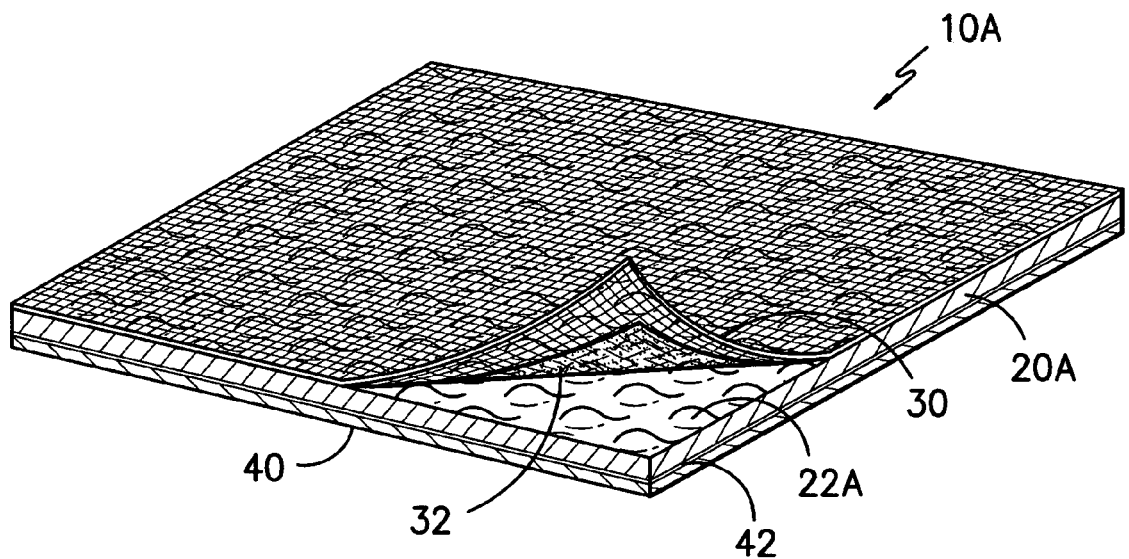
FIG. -1A-

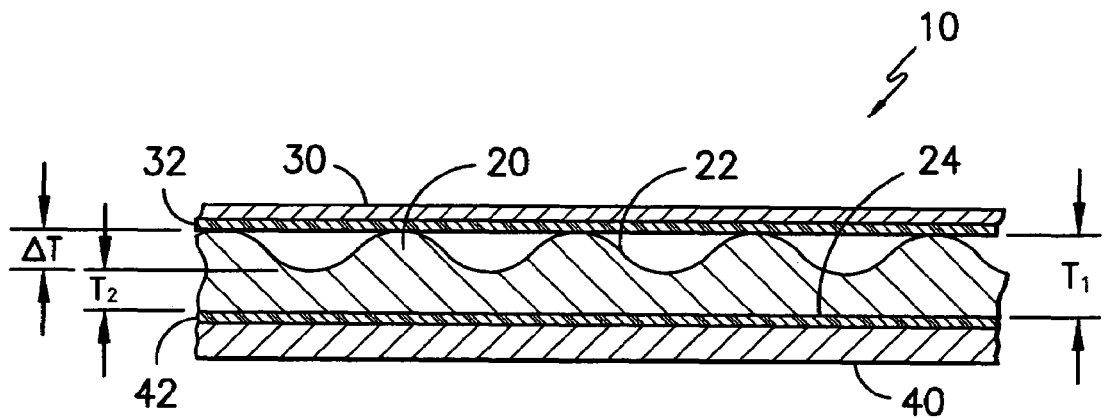
FIG. -2A-
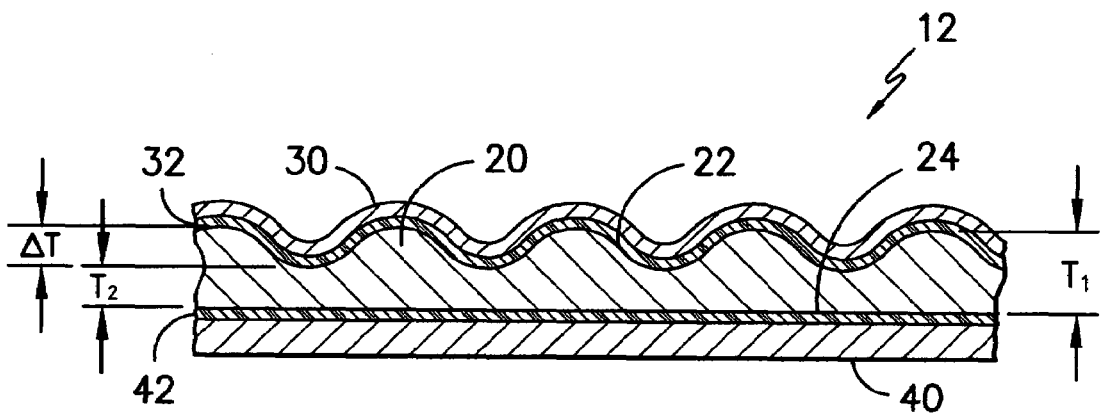
FIG. -2B-
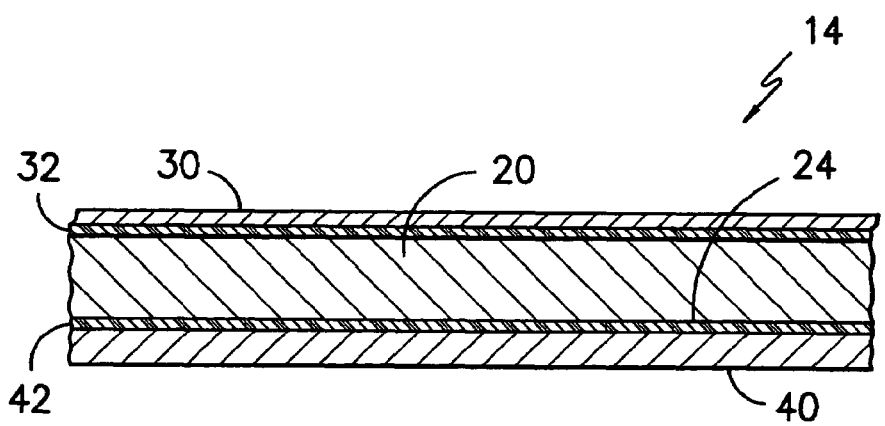
FIG. -2C-

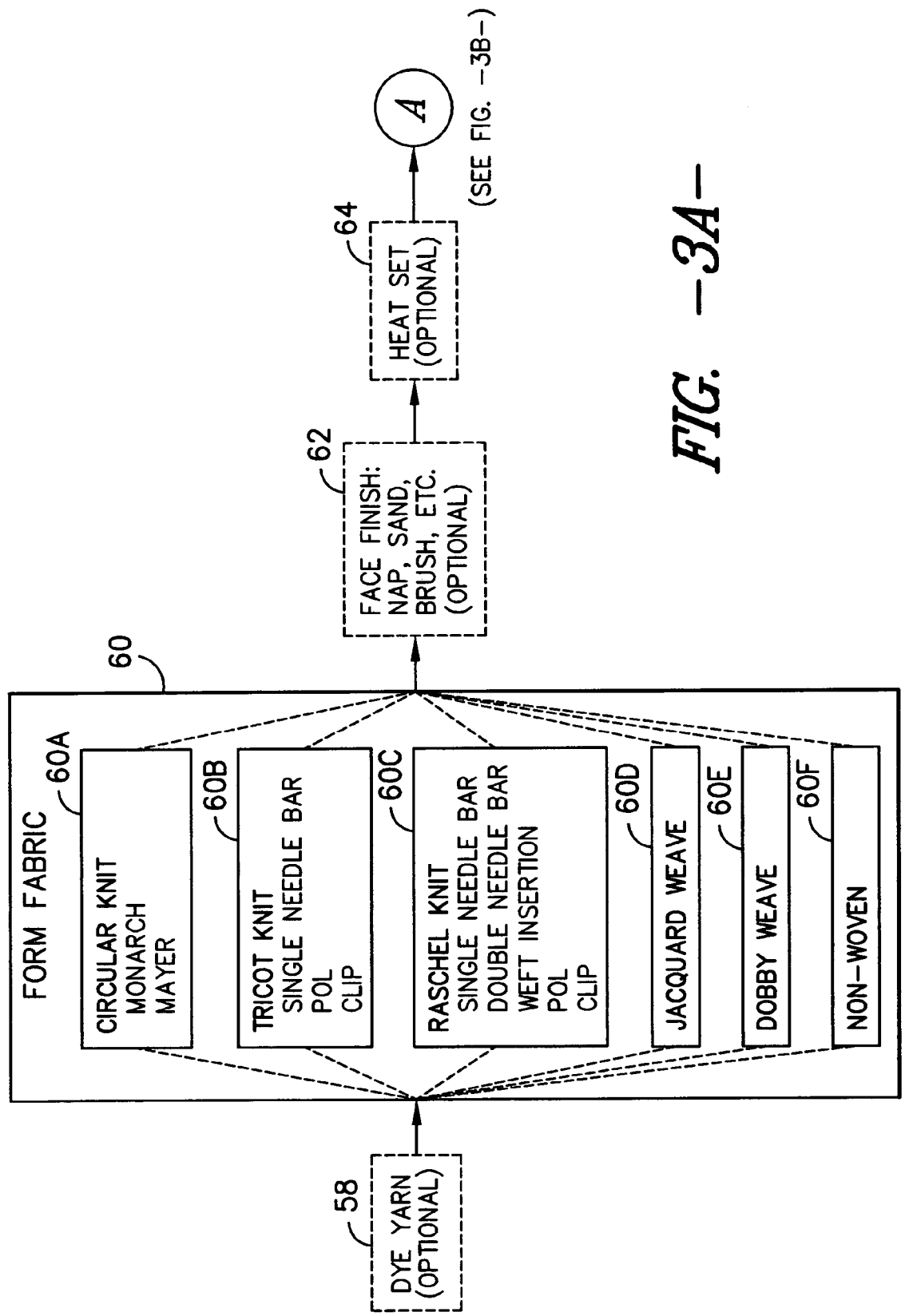

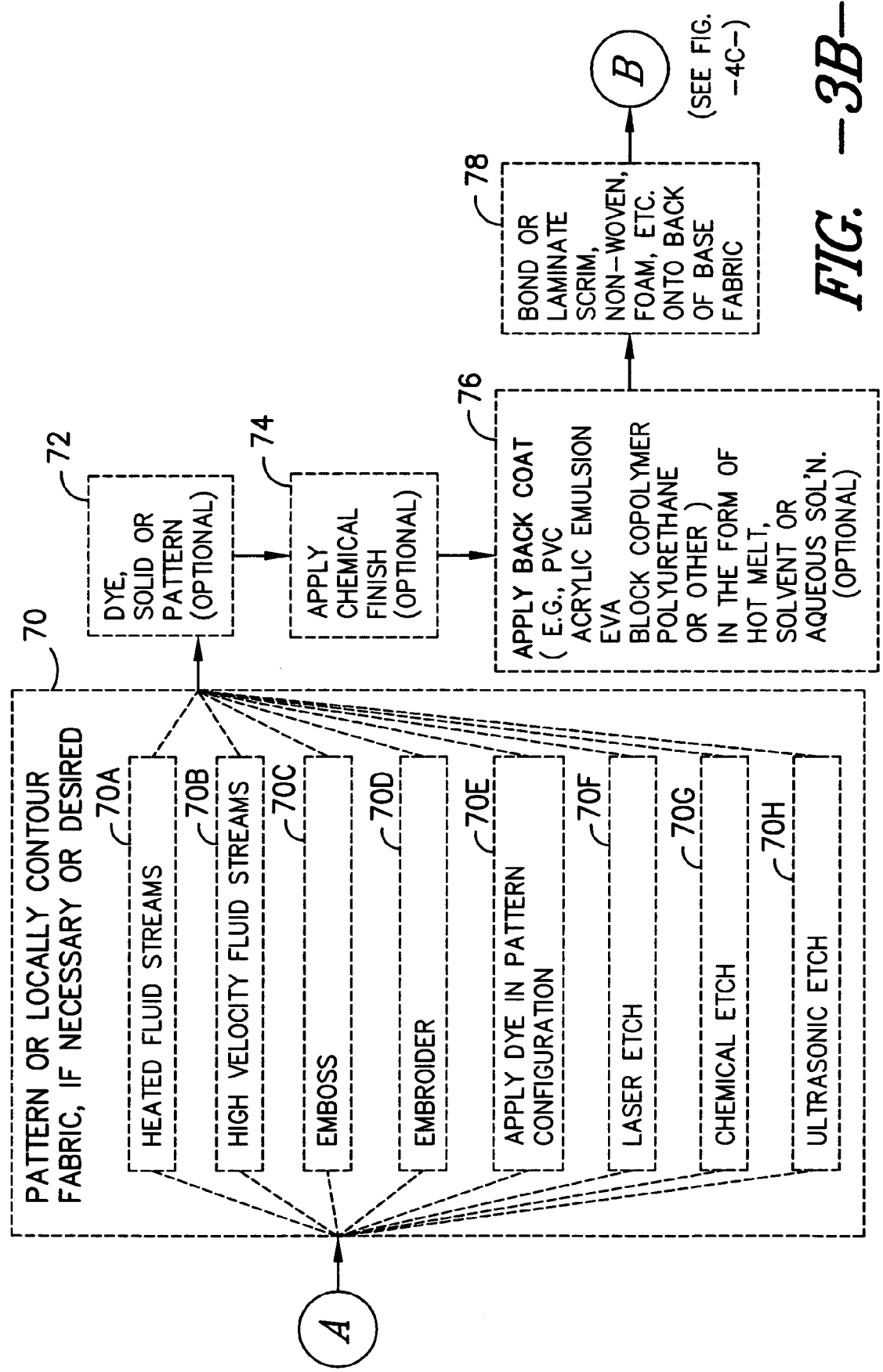

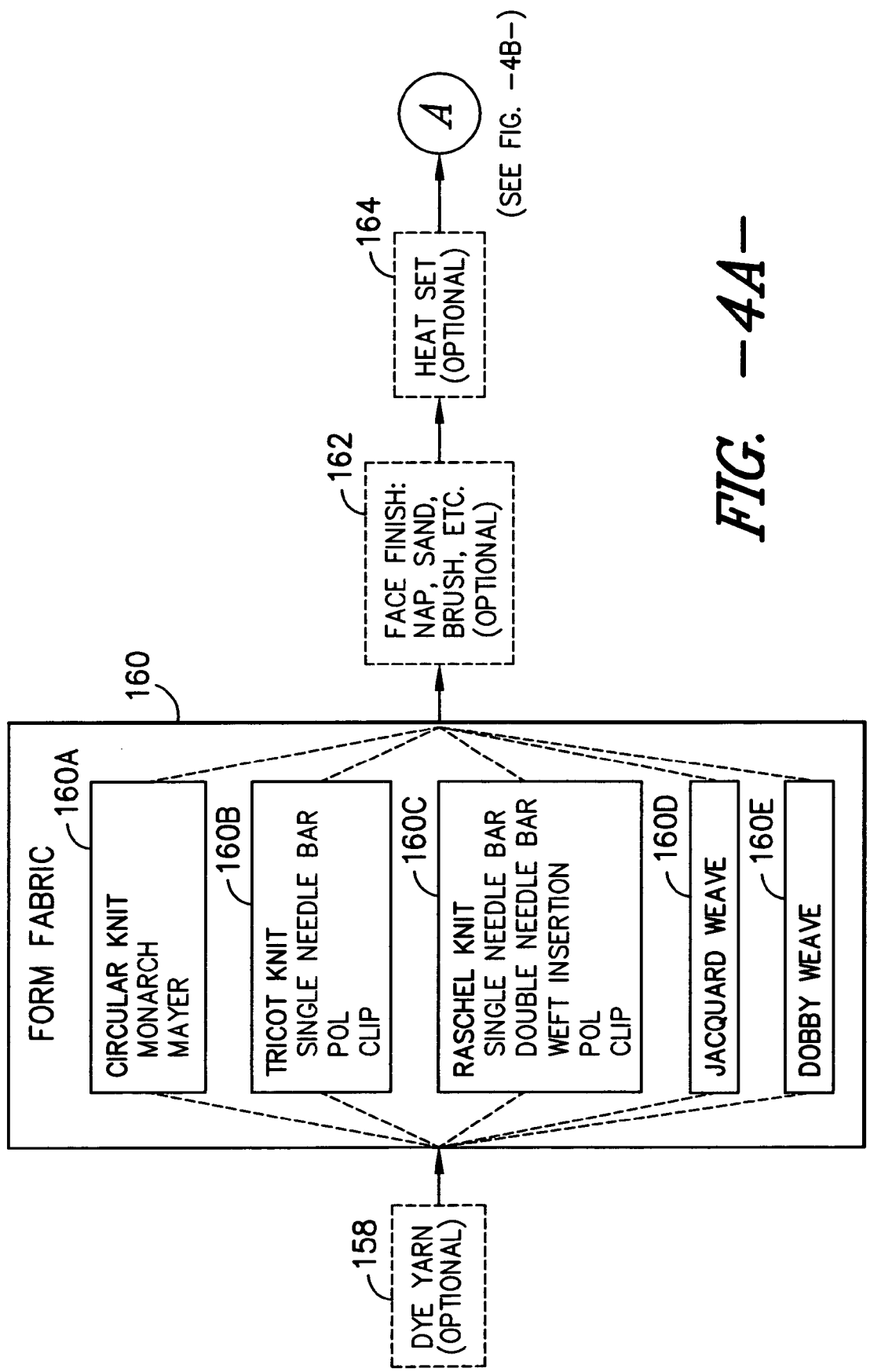

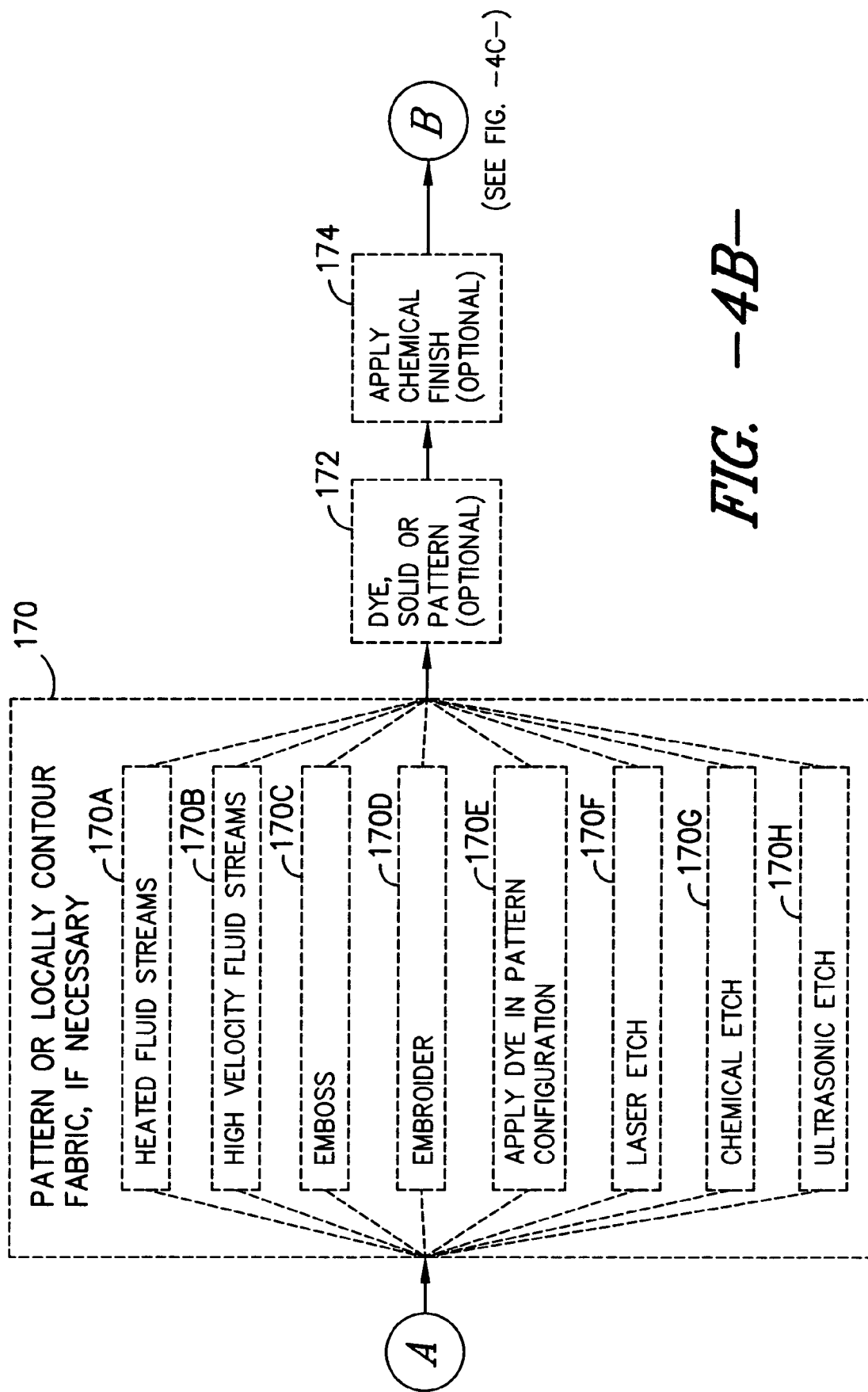

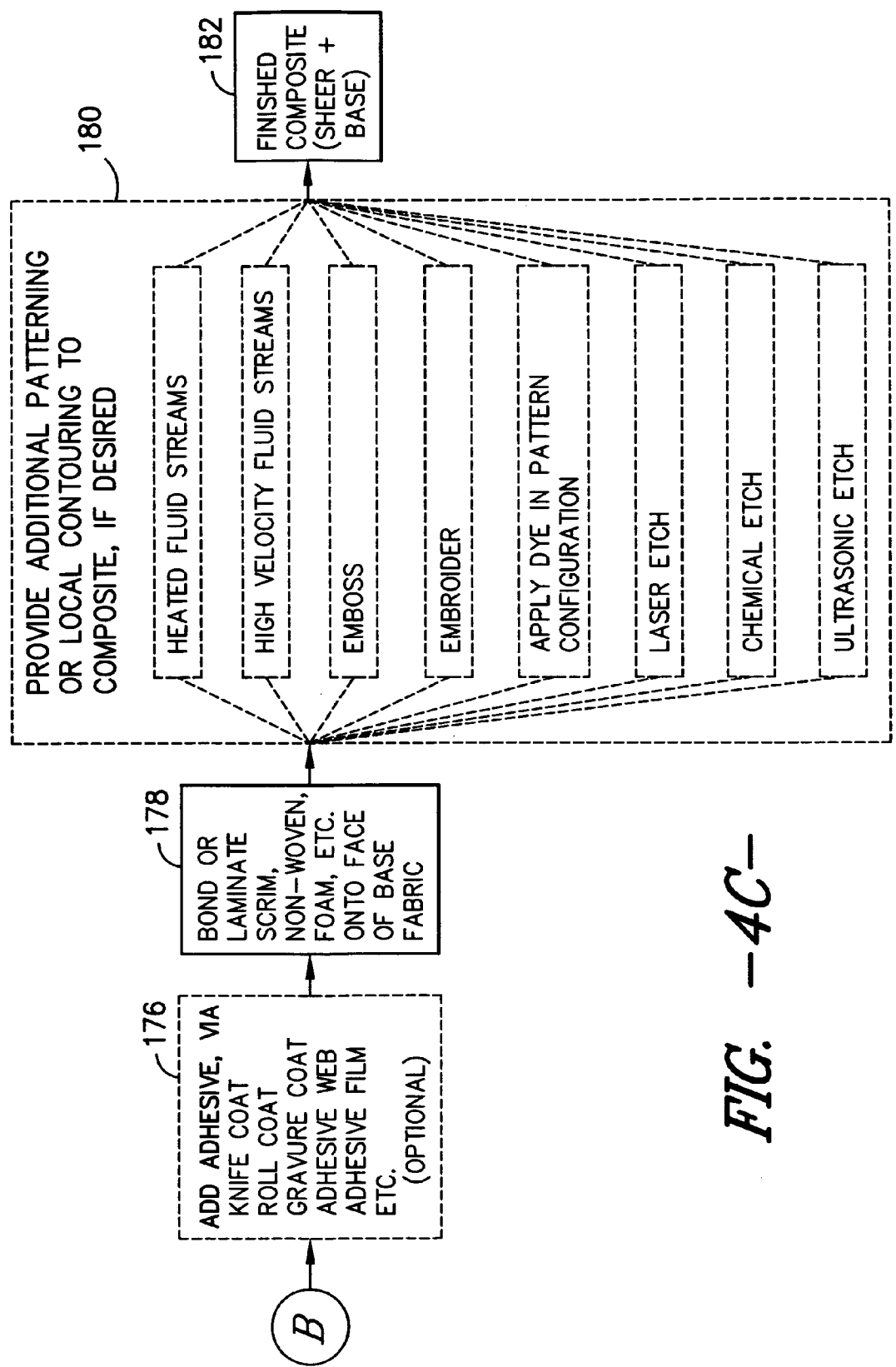
FIG. -4C-

COMPOSITE DIMENSIONAL FABRIC

CROSS-REFERENCE TO RELATED APPLICATIONS

This application claims priority to and benefit of U.S. Provisional Patent Application Ser. No 60/547,242, filed on Feb. 24, 2004, which is hereby incorporated by reference herein.

SUMMARY OF THE INVENTION

This disclosure relates to a family of composite fabrics comprising a relatively thick textile substrate or base to which is attached a sheer fabric, and a method for making same. Contours or patterns associated with the surface of the base to which the sheer fabric is attached are visible through the sheer fabric, imparting to the composite a decorative, three-dimensional quality that is both original and desirable. Additionally, it has been found that, by the addition of the sheer fabric, such composite generally resists certain kinds of abrasion, as compared with the base alone.

Optionally, one or more additional fabrics or substrates may be attached to the base, on the surface opposite that to which the sheer fabric is attached, thereby constructing a multi-layered sheet composite. Such optional additions may provide dimensional stability, padding, etc., to the composite fabric and perhaps better adapt the composite fabric to various upholstery applications, as, for example, in automotive and other transportation applications, interior furnishing applications for domestic or hospitality markets, etc.

Details of various embodiments and variations of such composite fabrics, and methods for making such fabrics, are explained below, with the aid of the accompanying drawings and definitions.

BRIEF DESCRIPTION OF THE DRAWINGS

The content of FIGS. 1 through 4, as referenced in the description that follows, is summarized below.

FIGS. 1 and 1A diagrammatically depict two embodiments of a composite fabric 10, 10A constructed in accordance with the description herein In FIG. 1, the base fabric 20 is Contoured on face 22; in FIG. 1A, the base fabric 20A is planar, but has been patterned on face 22A to appear contoured. Both FIGS. 1 and 1A can be said to involve base fabrics that appear to exhibit local contouring —in the case of FIG. 1A, the appearance is deceptive.

FIGS. 2A through 2C depict, in cross-section, three exemplary composite fabrics of the kind described herein. FIGS. 2A and 2C generally correspond to the embodiments depicted in FIGS. 1 and 1A, respectively.

FIGS. 3A and 3B, and FIGS. 4A through 4C, are process flow diagrams depicting steps, including alternative and optional steps, by which the fabric exemplified in FIGS. 1 through 2C may be manufactured. FIGS. 3A and 3B are directed to the formation of the base fabric component, including any additional layer or component added to the back of the base fabric; FIGS. 4A through 4C are directed to the formation of the sheer fabric component and the attachment of the sheer fabric to the face of the base fabric. In each of these Figures, dotted lines indicate actions or steps that are individually optional.

DETAILED DESCRIPTION OF THE INVENTION

As used herein, the following terms shall have the indicated meanings, unless express language or context otherwise dictates.

Contoured, locally contoured, or local contouring, as those terms are used herein, shall refer to undulations, depressions, or other sources of surface relief that cause the face or back of a fabric to be non-planar, i.e., to deviate from a smooth planar surface over a relatively localized area, for example, within an area or region of perhaps one or several square centimeters, so as to impart a three-dimensional pattern to the surface of the fabric. Typically, but not necessarily, the contour is replicated regularly throughout the fabric. However, for example, a logo desirably may be reproduced only in selected areas. The depth of contouring (i.e., the maximum difference in elevation or base fabric thickness between high and low contour features, respectively referred to as "peaks" and "valleys") is intended to be greater than that normally associated with the slightly textured surface common to regular woven or knitted flat fabrics. In such flat woven and knit fabrics, the crossover points of the yarns create the largest "contours" of the fabric, with a depth of contouring measured (as if viewed in cross-section) from the top of the bottom yarn (in the "valley") to the top of the crossover yarn (on the adjacent "peak"). For example, in a flat woven fabric, it is the elevation change in going from the top of a fill yarn to the top of a warp yarn on the adjacent fill yarn. In contrast, the fabrics discussed for use herein have surface contours that are created periodically, for example, by means of specific construction (use of larger and smaller yarns), using specific fabric formation methods capable of producing topographically patterned (i.e., non-planar) constructions (e.g., circular knitting, tricot knitting, or the other processes set forth in FIG. 3A), or with finishing techniques such as those set forth in FIG. 3B.

Sheer fabric, as the term is used herein, shall refer to fabric having a relatively low weight and a relatively open construction, allowing it to readily transmit light. When placed in contact with the face of a base fabric, a sheer fabric permits at least portions of the face of the base fabric to be seen through the sheer fabric under appropriate lighting conditions. The terms "faces" and "back" shall refer to respective opposing surfaces of the base or sheer substrates. As shown in FIGS. 2A through 2C, the face of base fabric 20 is the upper-most surface 22. with which the sheer fabric 30 is associated. The back 24 of base 20 is the lower surface of the base, to which any optional beck coating or other type of supporting or stabilizing structure may be attached, as by adhesive layer 42. The face of sheer fabric 30 is the upper-most surface depicted in FIGS. 2A through 2C; the back of sheer fabric 30 is that surface shown in the FIGS. to be in contact with adhesive layer 32.

Thickness T, as used to describe a base fabric, shall refer to the uncompressed thickness of the base fabric (i.e. the distance separating the parallel planes that define, respectively, the uppermost surface of the face—the elevation of the highest peak—and the back of the fabric). As shown in FIGS. 2A and 2B, $T_1$ refers specifically to the maximum uncompressed thickness of the base (i.e., peak-to-back thickness) and $T_2$ refers to the minimum uncompressed thickness of the base—measured at the bottom of the deepest valley to the back—in situations where the base is locally contoured.

The composite 10 shown in FIG. 1 is comprised of a relatively thick substrate or base 20, having a contoured face 22 to which is attached a sheer covering fabric 30. Optionally, a backing member 40 comprised of, for example, a back coating, an attached scrim, an attached non-woven substrate, or a relatively thin layer of open or closed-cell foam may be attached to the hack of the base in order to give the composite physical integrity, stability while cutting, or necessary weight, to establish a desired barrier for the rear surface of the composite, or to provide some other desirable attribute. Details of each of these components, along with (1) preferred embodiments, (2) process steps in manufacture, and (3) options and alternatives, are discussed below.

Base Fabric

Base fabric or substrate 20 may be constructed using any of a wide variety of textile materials, depending upon the desired characteristics of the composite and the selected technique used for constructing the base fabric. For example, fibers or yarns comprised of commonly available materials such as nylon, polyester, polypropylene, or cellulosic materials (e.g., rayon, cotton, etc.) may be used, as well as various engineered materials such as those marketed by Dupont (e.g., Nomex®, Kevlar®, etc.). Possible constructions of base fabric 20 include various types of weaving and knitting, as well as the use of non-woven constructions, as discussed below. Most commonly, base fabric 20 will have a non-pile surface; however, base fabric 20 may have a pile surface that is subsequently contoured or patterned (e.g., via optional Step 70, also discussed below.).

Looking at FIG. 3A, Blocks 58 through 64 outline several possible steps by which a suitable base fabric may be constructed. Beginning at optional Step 58, the selected yarn (or yarns, if different types are used) optionally may be dyed. This step is generally recommended in cases where a substantially uniform base fabric color is desired, or where yarns particularly suited to solution dyeing (e.g., polypropylene) are used. Where a multi-tone effect to complement the contoured surface is desired, the yarn dye step may serve to define one of the colors in a multi-tone color scheme created by one or more optional dyeing or patterning steps (see Step 70) following Step 60.

Step 60 represents the fabric formation step in which the base fabric is generated. As indicated in FIG. 3A, this step may involve various forms of knitting (including circular knitting 60A, tricot knitting 60B. and raschel knitting 60C), weaving (including jacquard weaving 60D and dobby weaving 60E), or the generation of a non-woven substrate 60F. The objective of this step is to form a fabric having a thickness that exceeds most single-component fabrics, and that, for those embodiments in which the base fabric is actually contoured (rather than merely being patterned to give the appearance of being contoured, as explained below), provides for sufficiently deep contouring to provide the desired visual effect in the completed composite fabric Generally, the bases contemplated herein will have a minimum uncompressed thickness (indicated at $T_1$ in FIGS. 2A through 2C) not less than about 0.3 mm to about 1.0 mm, with practical maximum thicknesses falling within the range of about 1.0 mm to about 10.0 mm. In many cases, bases in which $T_1$ falls within the range of about 0.5 mm to about 5.0 mm have been found to be preferable. Although not shown, any slitting or similar operations known by these skilled in the art to be necessary to provide the fabric in the desired form is implicit in Step 60.

Following fabric formation Step 60, the resulting fabric optionally may be subjected to various appropriate face finishing operations, such as napping, sanding, brushing, or the like, as signified in optional Step 62. The appropriately face-finished fabric then may be optionally subjected to a heat setting step, depicted at 64, to stabilize the base fabric's width, shrinkage characteristics, etc., as desired.

The local contouring of base fabric 20 can be imparted as part of the fabric formation process of Step 60 (e.g., by jacquard weaving 60D, dobby weaving 60E, circular knitting 60A. tricot knitting 60B, or Raschel knitting 60C, etc), or can be imparted or enhanced during a subsequent step (such as depicted at optional step 70 in FIG. 3B), in which a base fabric that may have been formed with insufficient contouring, or that was formed with a planar surface (e.g., no local contouring) is treated to establish such a locally contoured surface. Individual processes associated within Step 70, as listed in FIG. 3B, include localized yarn shrinkage or melting by heated fluid streams or melting (e.g., Step 70A, as, for example, is disclosed in commonly assigned U.S. Pat. Nos. 5,148,583, hereby incorporated by reference), yarn dislocation by high velocity fluid streams (e.g., Step 70B, as, for example, is disclosed in commonly assigned U.S. Pat. No. 5,238,733, hereby incorporated by reference), yarn deformation, as by, for example, embossing (Step 70C), embroidering (Step 70D). and yarn melting or degradation (eg., through techniques such as laser etching, chemical etching, or ultrasonic etching, as in Steps 70F through H). This collection of techniques is intended to be non-exclusive—it is contemplated that two or more may be used on the same base fabric, and that other conventional processes may readily be used or adapted for use in providing local contouring to base fabric 20 as may occur to those skilled in the art. Fabrics that emerge from Step 60 as locally contoured may also be subjected to one or more of the processes of Step 70 if additional or enhanced contouring is desired.

Among the various optional treatments shown at Step 70, Step 70E merely involves the application of one or more dyes to the surface of the base fabric in a pattern configuration. This may be achieved through any of several well-known processes, such as by screen-printing or by the application of metered quantities of colorants from individual, computer-controlled dye nozzles such as disclosed in commonly-assigned U.S. Pat. No. 4,202,189. If the base fabric was formed having a locally contoured face, the patterning can be done either in registration with such contours, or in some other configuration that is complementary or aesthetically desirable, as, for example, in a manner that serves to augment or exaggerate the contoured appearance of the base fabric. Alternatively, the patterning can simply be decorative in the ordinary sense. In the case where the base fabric was formed with a planar, non-contoured face (e.g., as depicted in FIGS. 1A and 2C), the patterning can be done so as to provide the appearance of a locally contoured surface, through use of shadow and highlight, or through use of trompe l'oeil techniques.

The depth of contouring (i.e., the difference in fabric thickness measured at various lateral locations across the face of fabric 20) is dependent upon a number of factors, including the initial depth of the base fabric 20 and the visual effect to be achieved with the resulting composite fabric. Typically, this difference in thickness or elevation (diagrammatically depicted in FIGS. 2A and 2B as $\Delta T$) will be at least 0.2 mm, and more typically will lie within the range of about 0.5 mm to about 2.5 mm, but could easily be greater, e.g., as much as a centimeter or more, if the base fabric is sufficiently thick and extreme contouring is necessary or desired. For example, if the composite is to be used in applications where sound absorption is important, deep contouring adapted to increase surface area or to accommodate sounds of specific short wavelengths may be used.

Referring to FIGS. 2A and 2B, it is contemplated that $T_1$ have a value that is at least 0.3 mm or greater, and preferably 1.0 mm or greater, with $T_2$ ranging in value from perhaps 90% of the value of $T_1$ to perhaps 10% (or less) of $T_1$, so long as base 20 maintains sufficient physical integrity to allow for manufacture. It is also contemplated that $T_2$ could, in fact, be 0%, indicating the case where the base fabric is perforated with holes that extend the entire distance $T_1$. At the other extreme, $T_2$ for the non-contoured composite of FIG. 2C is 100% of $T_1$. Because the visual contouring of the base fabric of FIG. 2C is achieved wholly through the application of dye in a pattern configuration (as, for example, by step 70E), the thickness requirements of base fabric 20 can be less than would otherwise be preferred.

Following such patterning step 70, the base fabric optionally may be dyed (if not already dyed in Step 70E), either a solid color or in a pattern (optional Step 72). In optional Step 74, a chemical finish or treatment optionally may be applied by any appropriate means to provide the base fabric with desired water repellency, anti-microbial properties, etc.

Optional Step 76 provides for the application of a coating to the back of the base fabric. Such coating can be comprised of any of a variety of materials, such as PVA, acrylic emulsions, EVA, various block copolymers, polyurethane, and other common or conventional treatments used to back coat textiles, applied, for example, as a hot melt, or in an aqueous or solvent-based solution. Optional Step 78 provides for the bonding or lamination, again to the back of the base fabric, of an additional layer such as, for example, a scrim, film, open or closed cell foam, or non-woven web. It is contemplated that Steps 76 and 78 may be used individually or together in situations where one or more additional layers are desired on the back of the base fabric, perhaps to give the base fabric additional physical integrity, cutting stability, weight, or bulk, to provide a barrier to moisture or a contaminant, or to assist in subsequent parts molding operations, etc.

The specific process flow presented is exemplary and illustrative only, and is not intended to be limiting in any way. For example, it is contemplated that local contouring (Step 70) could occur following bonding (Step 78). Similarly, face finishing (Step 62) could occur following dyeing (Step 72). These specific process step sequence changes could occur independently or together in the same process flow. Other such changes may be readily apparent to those skilled in the art.

Sheer Fabric

Construction of the sheer fabric useful for the applications described herein is in accordance with the steps depicted in FIGS. 4A and 4B. Any suitable fibers or yarns may be used, including those discussed in connection with the construction of the base fabric, so long as such yarns or fibers are appropriate for use in forming a sheer fabric of the kind contemplated herein, i.e., one that generally will provide the desired degree of attachment to the base fabric and that will minimize the degree of opacity resulting from its use as a cover over the contoured portions of the base fabric.

In optional Step 158 of FIG. 4A, the yarns used to construct the sheer fabric optionally may be dyed, either uniformly or in a pattern configuration, preferably to match or complement the color of the yarns to be used in the accompanying base fabric. When in place over the face of the base fabric, the sheer fabric will obscure, to a greater or lesser degree, the face of such base fabric, depending upon the color and relatively opacity of the sheer fabric, the color and contour of the base fabric, etc. It is contemplated that, in some applications, sheer fabric may be kept in greige form in order to make the sheer fabric as unobtrusive as possible. However, it is recognized that, for some applications, some degree of opacity may be desirable. By appropriate dyeing of the yarns and careful selection and adjustment of the fabric formation process (discussed below), the degree of opacity may be adjusted accordingly. Typically, sheer fabric 30 is preferably capable of transmitting at least 20% of directly incident light, and, more preferably, capable of transmitting at least 30% to 40% of directly incident light, up to a practical maximum of perhaps 60% to 70%.

Formation of the sheer fabric is represented at Step 160. As indicated in FIG. 4A, and as set forth in corresponding fashion in FIG. 3A in connection with the formation of the base fabric, a variety of fabrication methods may be used to form the sheer fabric. It is intended that the choice of yarns and yarn weights, when used to form fabric using, for example, a specifically selected fabrication technique selected from those identified at 160A through 160E of FIG. 4A, will result in a fabric that is relatively light transmissive, and that has a weight perhaps within the range of about 5 $gms/m^2$ to about 100 $gms/m^2$ and preferably within the range of about 15 $gms/m^2$ to about 50 $gms/m^2$.

Following fabric formation step 160, the sheer fabric optionally may be subjected, in optional Step 162, to one or more conventional face finishing processes such as napping, sanding, brushing, etc., with care needed to avoid unintended physical damage to the fabric. Following such step, the sheer fabric may be heat set (optional Step 164) to provide dimensional stability, etc.

As may be apparent, the processing steps for the sheer fabric bear close correspondence with steps used in the preparation of the base fabric. In optional Step 170, the sheer fabric may be patterned or contoured, using the techniques described above with reference to Step 70 (identified as 170A through 170H, respectively corresponding to Steps 70A through 70H, discussed above), with appropriate modifications to operating parameters, etc., to accommodate the nature of the sheer fabric. As mentioned above, other techniques that may occur to those skilled in the art may also be used. The sheer fabric optionally may be dyed (optional Step 172, corresponding to optional Step 72, above), perhaps in a pattern to enhance or augment the underlying contouring or patterning of base fabric 20, or to enhance, augment or mitigate the relative opacity of the sheer fabric. The sheer fabric optionally may also be subjected to a chemical treatment or finish (optional Step 174), for the purpose of reducing opacity, providing desired stiffness, enhancing surface smoothness or slickness, imparting water repellency or anti-microbial properties, etc.

Formation of Composite

Following Step 174, the sheer fabric moves to Steps 176 and 178, in which the sheer fabric is glued, bonded, laminated, or otherwise attached to the face of the fully processed base fabric (the base fabric having either undergone or bypassed one or more of the optional processing Steps 62 through 78 of FIGS. 3A and 3B). Such attachment may be permanent, as through the use of a conventional adhesive (applied at optional Step 176), or may be achieved through the application of a releasable adhesive (also applied at optional Step 176), the latter being preferred. if occasional access to the underlying base fabric is desired. In either case, it is preferred that the adhesive used not render the sheer fabric excessively opaque, so as to obscure totally the face of underlying base fabric 20. Finally, optional Step 180 provides an opportunity for additional patterning or localized contouring of the sheer+base composite that was formed in Step 178, perhaps using some of the techniques of step 170, as appropriate. The final composite product is indicated at Step 182.

FIGS. 2A and 2B depict, in cross section, two extremes in the final configuration of the sheer+base composite formed in Step 178. In FIG. 2A, the sheer fabric 30 is attached, via adhesive layer 32, to only the upper-most portions or peaks of the face 22 of contoured base 20. The visible contoured face of base fabric 20, when viewed through sheer fabric 30 and adhesive layer 32, provides the sheer+base composite 10 with a three-dimensional appearance. This effect has been depicted in FIG. 1. The addition of optional back layer 40, perhaps attached via adhesive layer 42, may provide the sheer+base composite 10 with qualities or properties useful in, for example, automotive upholstery applications. It should be noted that, due to the planar configuration of the sheer fabric and its capacity to present a low-friction surface, the addition of sheer fabric 30 to contoured base fabric 20 results in a significant increase in the ability of the composite fabric to resist the effects of abrasion. Taber abrasion tests, conducted in accordance with ASTM 03884 on woven base fabrics In which the contouring was achieved by the incorporation of float yarns in the face of the fabric, indicated that use of a sheer fabric resulted in greater than a 100% improvement in Taber abrasion.

In FIG. 2B, the sheer fabric 30 is again attached, via adhesive layer 32, to the face 22 of contoured base 20. However, in this case sheer fabric 30 has been made to conform to the local contours of the face of base 20. The three dimensional nature of the composite 12 is now primarily conveyed by the contoured nature of the sheer fabric 30, which in turn is determined by the contoured nature, of the base 20 to which it is attached. As before, the addition of optional back layer 40, perhaps attached via adhesive layer 42, may be added to provide additional suitability of the composite 12 for certain applications.

Again, the addition of sheer fabric 30 to contoured base fabric 20 results in a significant increase in the ability of the composite 12 to resist the effects of abrasion. As before, Taber abrasion tests, conducted in accordance with ASTM D3884 on woven base fabrics in which the contouring was achieved wholly by the incorporation of float yarns in the face of the fabric, indicated that use of a sheer fabric resulted in greater than a 100% improvement in Taber abrasion.

It is anticipated that intermediate configurations of sheer fabric on base fabric, in which sheer fabric 30 conforms only partially to the underlying contours of base fabric 20, may be employed as well.

It is foreseen that base fabric 20 may not always be locally contoured. As depicted in FIG. 2C, as well as FIG. 1A, composite 14 is shown, in which the face of the base fabric 20 is not substantially contoured, but rather Is dyed in a manner that imparts the appearance of a locally contoured surface (by. for example, a pattern that suggests highlights and shadows or by using trompe d'oeil techniques), which may be observed through sheer fabric 30. While this technique is primarily intended for use with bases having a face that is essentially flat or smooth, it may also be adapted for use with bases having a locally contoured face. In the former case, the dyed pattern can impart a contoured or three-dimensional character to a face that is essentially two dimensional (i.e., flat and smooth); in the latter case, the dyed pattern may be used to enhance and perhaps exaggerate the existing contours of the face of base fabric 20.

The specific embodiments and parameters presented throughout this description are exemplary and illustrative only, and are not intended to be limiting in any way. It is contemplated that other, substantially equivalent materials, configurations, arrangements, parameter values, and specific functions may be substituted without departing from the spirit of the teachings herein. Therefore, it is not intended that the scope of the development disclosed herein be limited to specific embodiments illustrated and described.

We claim:

1. A composite comprising a relatively thick substrate having a face and a back and comprised of textile yarns, said face having a surface that exhibits local contouring due to said substrate having areas of different thicknesses, said composite further comprising a sheer fabric that covers and is attached to the face of said substrate, wherein said local contouring is visible through said sheer fabric.

2. The fabric of claim 1 wherein an application of dye to the face of said substrate in a pattern enhances the appearance of local contouring.

3. The fabric of claim 1 wherein said substrate has a maximum thickness falling within the range of about 0.5 mm and about 5.0 mm, and said substrate has a minimum thickness falling within the range of 0.3 mm and 2.5 mm.

4. The fabric of claim 1 wherein said substrate has a planar back and a non-planar face, said face being comprised of intact textile yarns configured as part of a fabric formation process that produces a topographically patterned surface, thereby forming local contouring on said face.

5. The fabric of claim 1 wherein said substrate has a planar back and a non-planar face, said face being comprised of textile yarns that have been locally shrunken.

6. The fabric of claim 1 wherein said sheer fabric has an opacity within the range of 20% to 70%.

7. The fabric of claim 1 wherein said sheer fabric has an opacity within the range of 30% to 60%.

8. The fabric of claim 1 wherein said sheer fabric is dyed.

9. The fabric of claim 1 wherein said sheer fabric is dyed in a pattern.

10. The fabric of claim 1 wherein said sheer fabric substantially conforms to said local contouring of said substrate.

11. The fabric of claim 1 wherein said substrate back is coated.

12. The fabric of claim 1 wherein a backing member is attached to said substrate back.

13. A process for fabrication a composite textile fabric comprising the stays of:
   a. forming, from textile yarns, a substrate having a face and a back, wherein said face is locally contoured due to the substrate having areas of different thicknesses;
   b. forming a sheer fabric having an opacity of at least 20%; and
   c. covering said face of said substrate and attaching said sheer fabric thereto, so that said apparent local contouring of said substrate is visible through said sheer fabric.

14. The process of claim 13 wherein said sheer fabric is dyed prior to being attached to said substrate.

15. The process of claim 13 wherein said back of said substrate is planar and said face of said substrate is non-planar.

16. The process of claim 15 wherein said face of said substrate is contoured as a result of using a fabric formation process that produces a topographically patterned surface.

17. The process of claim 15 wherein textile yarns comprising said non-planar face are locally shrunken.

18. The process of claim 15 wherein said sheer fabric, following being attached to said substrate, substantially conforms to said local contouring of said substrate face.

19. The process of claim 13 wherein a coating is applied to the back of said substrate.

20. The process of claim 13 wherein an additional backing member is attached to said substrate back.

* * * * *

UNITED STATES PATENT AND TRADEMARK OFFICE
CERTIFICATE OF CORRECTION

PATENT NO. : 7,384,681 B2  
APPLICATION NO. : 11/063185  
DATED : June 10, 2008  
INVENTOR(S) : Kirkland W. Vogt et al.

Page 1 of 1

It is certified that error appears in the above-identified patent and that said Letters Patent is hereby corrected as shown below:

In column 8, line 48, delete the word "stays" and replace with the word "steps".

Signed and Sealed this

Twenty-seventh Day of January, 2009

JOHN DOLL  
*Acting Director of the United States Patent and Trademark Office*